(12) United States Patent
Brückner et al.

(10) Patent No.: US 7,770,085 B2
(45) Date of Patent: Aug. 3, 2010

(54) REPLACEMENT MESSAGES FOR IDENTIFYING AND PREVENTING ERRORS DURING THE TRANSMISSION OF REAL TIME-CRITICAL DATA

(75) Inventors: Dieter Brückner, Unterleiterbach (DE); Dieter Klotz, Fürth (DE); Karl-Heinz Krause, Nürnberg (DE); Jürgen Schimmer, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 338 days.

(21) Appl. No.: 10/490,534

(22) PCT Filed: Sep. 12, 2002

(86) PCT No.: PCT/DE02/03406

§ 371 (c)(1),
(2), (4) Date: Mar. 19, 2004

(87) PCT Pub. No.: WO03/028279

PCT Pub. Date: Apr. 3, 2003

(65) Prior Publication Data

US 2004/0243902 A1     Dec. 2, 2004

(30) Foreign Application Priority Data

Sep. 26, 2001  (DE) ................................ 101 47 426
Jun. 27, 2002  (DE) ................................ 102 28 822

(51) Int. Cl.
*H04L 1/00*    (2006.01)

(52) U.S. Cl. ...................................... 714/747; 370/242
(58) Field of Classification Search ................. 370/242; 714/747
See application file for complete search history.

(56) References Cited

U.S. PATENT DOCUMENTS

| | | | | |
|---|---|---|---|---|
| 4,494,230 A * | 1/1985 | Turner | ......................... | 370/409 |
| 5,309,435 A * | 5/1994 | Hirome | ....................... | 370/244 |
| 5,339,314 A * | 8/1994 | Tanaka et al. | ................ | 370/230 |
| 5,699,367 A | 12/1997 | Haartsen | | |
| 5,768,250 A * | 6/1998 | Albrecht | ...................... | 370/216 |
| 6,584,104 B1 * | 6/2003 | McGowan | ................... | 370/394 |
| 7,137,626 B2 * | 11/2006 | Lam | ........................... | 370/216 |

FOREIGN PATENT DOCUMENTS

| | | |
|---|---|---|
| EP | 0 866 579 A1 | 9/1998 |
| WO | WO 01/15374 A1 | 3/2001 |

* cited by examiner

*Primary Examiner*—Kevin L Ellis
*Assistant Examiner*—Steve Nguyen

(57) ABSTRACT

The invention relates to a method for transmitting real time-critical data using data messages in a data network. The data messages have an identification, useful data and a transfer status. According to the inventive method, data messages comprising errors are replaced by replacement messages that have the same structure as the data messages. The replacement message has the same identification as the data message to be replaced and is thus forwarded via the switching node, which would have been used to route the error-free data message. The replacement message can contain details of the type of transmission error.

12 Claims, 3 Drawing Sheets

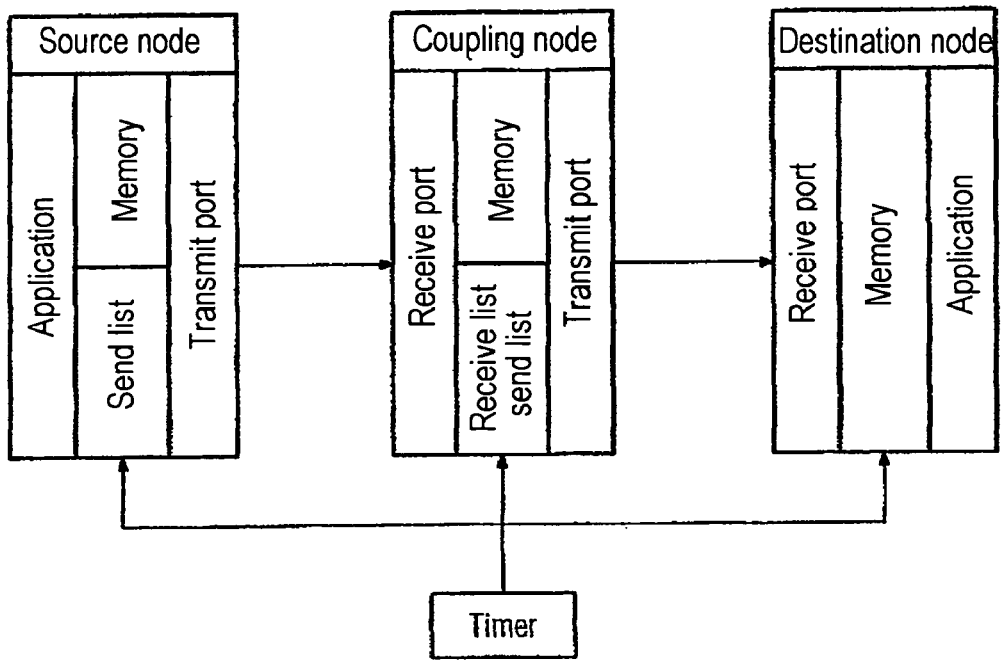

… (1)

REPLACEMENT MESSAGES FOR IDENTIFYING AND PREVENTING ERRORS DURING THE TRANSMISSION OF REAL TIME-CRITICAL DATA

CROSS REFERENCE TO RELATED APPLICATIONS

This application is the US National Stage of International Application No. PCT/DE02/03406, filed Sep. 12, 2002 and claims the benefit thereof. The International Application claims the benefits of German application No. 10147426.1 filed Sep. 26, 2001, and of German application No. 10228822.4 filed Jun. 27, 2001, all of the applications are incorporated by reference herein in their entirety.

FIELD OF INVENTION

The invention relates to a method for identifying and avoiding errors in the transmission of realtime-critical data using data messages in a data network, especially in an automation system.

BACKGROUND OF INVENTION

Data networks are formed from a number of network nodes and allow communication between a number of subscribers. Communication here means the transmission of data between the subscribers. The data to be transmitted in this case is sent as data telegrams, which means that the data is packed into one or more packets and sent in this form over the data network to the appropriate recipient. The term data packet is thus used. The term transmission of data is used in this document fully synonymously with the above-mentioned transmission of data telegrams or data packets.

For networking in switchable high-performance data networks for example, especially Ethernet, the subscribers are interlinked via coupling nodes. Each coupling node can be connected to more than two subscribers and can also be a subscriber itself. Subscribers are for example computers, Programmable Logic Controllers (PLC) or other machines which exchange electronic data with other machines and especially process it.

A method of transmitting data packets is known from EP 0 866 579 A1 in which the data packet is transferred from the transmit station to the receive station, without having an individual identification.

In distributed automation systems, for example in the area of drive technology, specific data must arrive at specific times at the intended subscribers and must be processed by the recipients. This is referred to as realtime-critical data or realtime-critical data traffic since if the data does not arrive at its intended destination at the right time this can produce undesired results at the subscriber.

The Use of a synchronous clocked communication system with equidistant characteristics in an automation system is also known from the prior art. This is taken to mean a system consisting of at least two subscribers that are linked via a data network for the purposes of mutual exchange of data or mutual transmission of data. In this case data is exchanged cyclically in equidistant communication cycles which are specified by the communication clock used by the system. Subscribers are for example central automation devices, e.g., Programmable Logic Controllers (PLC) or other control units, computers or machines which exchange electronic data with other machines and process data, especially from other machines and peripheral devices, e.g. input/output modules, drives, actors, sensors. In this document control units are taken to mean closed loop controllers or control units of all types. Typical examples of communication systems used for data transmission are bus systems such as Field Bus, Profibus, Ethernet, Industrial Ethernet, FireWire or also PC-internal bus systems (PCI), etc. In such systems data telegrams are fed into the data network at fixed points for transmission by a subscriber.

Automation components (e.g. controllers, drives, . . . ) nowadays often have an interface to a cyclically clocked communication system. A run level of the automation components (fast-cycle) (e.g. positional control in a controller, torque control of the drive) is synchronized to the communication cycle. This defines the communication timing. Other lower-performance algorithms (slow-cycle) (e.g. temperature controllers) of the automation components can also only communicate via this communication clock with other components (e.g. binary switches for fans, pumps, . . . ), although a slower cycle would be adequate. Using only one communication clock for transmission of all information in the system produces high demands on the bandwidth of the transmission link and on the communications arrangement of the components.

These high demands cannot always be fulfilled and the result can be transmission errors. Possible transmission errors are:

non-arrival or late arrival of a data telegram;
overflow of a data buffer in a coupling node;
incorrect length of a data telegram;
a physical CRC (Cyclic Redundancy Check) error.

With data networks known from the prior art an incorrect data telegram can trigger an error reaction at all data network nodes via which it is forwarded. Error diagnosis is only possible with the telegrams intended for the purpose. This leads to an additional load on the data network, and makes error diagnosis more difficult and causes delays in diagnosis.

SUMMARY OF INVENTION

The object of the invention is to avoid error reactions in the transmission path of errored data telegrams and create an improved method of error diagnosis.

The object of the invention is achieved with the features of the Independent patent claims. Specific embodiments of the invention are specified in the dependent patent claims.

In the method in accordance with the invention data telegrams with errors are basically not forwarded. In this case it is to be viewed as advantageous that the errored data telegram does not trigger error reactions at any further data nodes. Instead of forwarding an errored data telegram a data network node at which no error-free data telegram with a specific identification has arrived by the forwarding time assigned to the identification or is still arriving during the forwarding time sends out a replacement telegram with the identification.

The store-and-forward method and the cut-through method can be used for the forwarding. With the store-and-forward method a data telegram is completely received and is buffered before forwarding By contrast, with the cut-through method, the data is not buffered but is forwarded directly from the receive buffer to the transmit port.

Data telegrams generally have an identification, useful data and a transfer status. Replacement telegrams likewise have an identification, useful data and a transfer status. The identification of the replacement telegram is that of the telegram to be replaced. The useful data can be any data. The transfer status identifies the telegram as a replacement telegram. The transfers status can also specify the type of transmission error that has occurred. It his advantageous that no additional data telegram is needed for error diagnosis.

Replacement telegrams that are received up to the time of forwarding are forwarded by a coupling node like normal data telegrams at the forwarding time via the transmit port assigned to the identification or identifications. In the preferred embodiment of the invention a coupling node can receive and forward a number of data telegrams with the same identification.

In the case of an application it is assumed that initially a data telegram was received at the destination node which is not a replacement telegram and that its useful data and the assigned timer value were stored. If the destination node receives a further data telegram with the same identification it first checks to see whether this is a replacement telegram. If it is, the stored user data and the assigned timer value are basically not replaced. In a preferred embodiment of the invention the arrival of a replacement telegram at the destination node is recorded. If the further data telegram is not a replacement telegram a further check is made on the basis of the timer value as to whether the saved useful data is still current. If the useful data is still current this can be replaced but it does not have to be replaced. If the useful data is not current it is basically replaced by the useful data of the further data telegram. Before the useful data is forwarded to an application of the destination node it must be completely received and buffered since forwarding of the useful data of a data telegram not yet completely received could lead to malfunctions of the application.

BRIEF DESCRIPTION OF THE DRAWINGS

Preferred embodiments of the invention are explained in more detail below with reference to the drawings. The drawings show.

FIG. 2 a schematic connection between a source node and a destination node via a coupling node;

FIG. 3 the structure of a DTX Ethernet frame from the prior art and an Ethernet frame in accordance with invention;

DETAILED DESCRIPTION OF INVENTION

Figure 1:
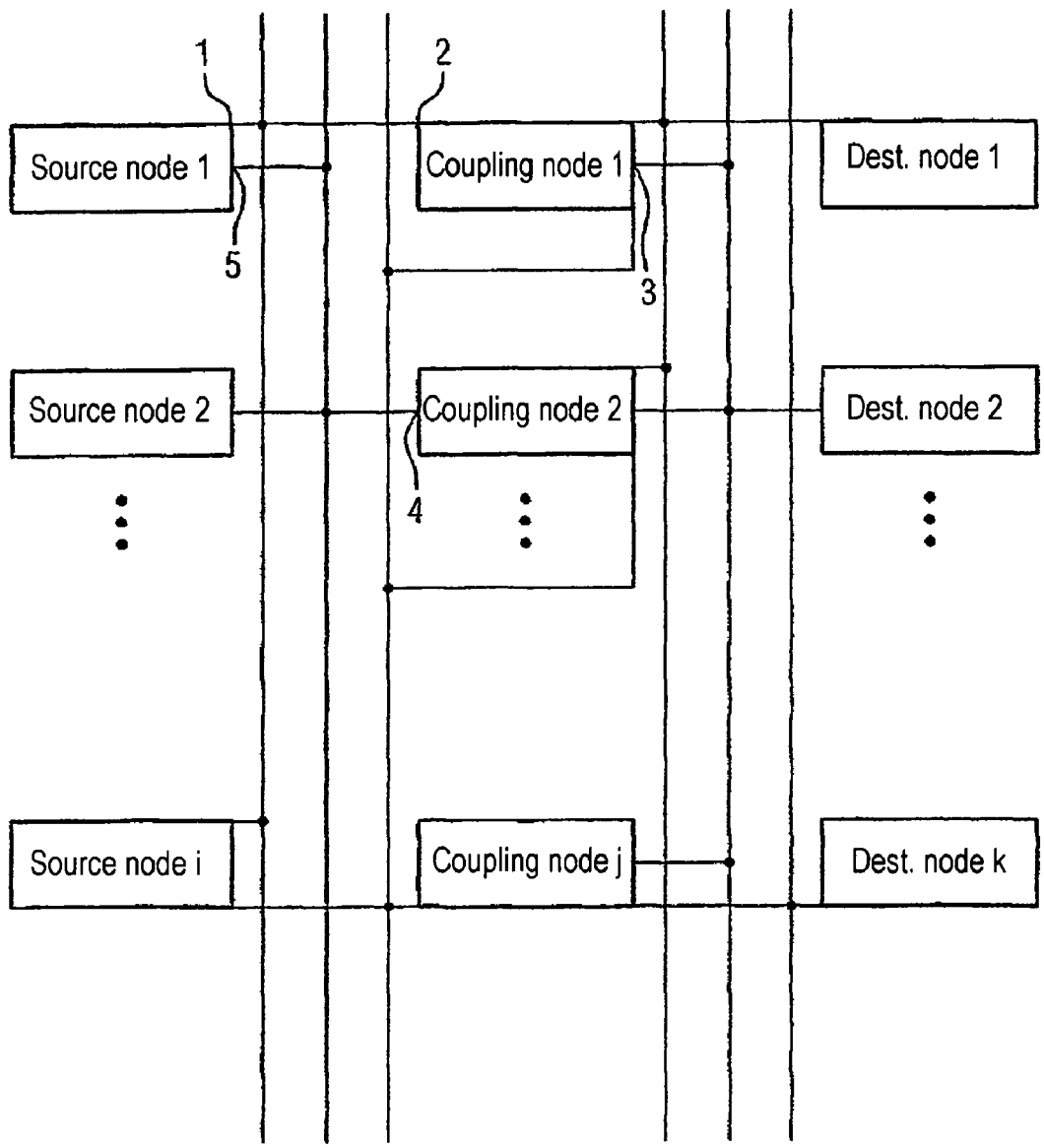
FIG. 1 a network diagram of a data network in accordance with the invention for transmitting realtime-critical data.

FIG. 1 shows a data network in accordance with the invention for transmission of realtime-critical data. The source nodes i are connected directly via the coupling nodes j to the destination nodes k. The data is transmitted via data buses which link data network nodes to each other. A data telegram can for example be forwarded from transmit port 1 of the source node i=1 via the receive buffer 2 and the transmit port 3 of the coupling node j=1 to the receive buffer 4 of the coupling node j=2. But it can also be sent directly from transmit port 5 of the source node i=1 to the receive buffer 4 of the coupling node j=2. It his therefore evident that a data telegram can travel from the source node i=1 either via the coupling node j=1 or the coupling node j=2 to the destination node k=1. This shows that both a coupling node and also a destination node can receive identical data telegrams, which can thus also possess an identical identification, via different network paths.

FIG. 2 shows a connection between a source node and a destination node via a coupling node. The source node stores data which was identified with the aid of an application of the source node in the form of a data telegram with a specific identification. At the transmit time specified by the identification the data telegram will be transmitted via a transmit port to one or more coupling nodes. The data telegram is received at a receive buffer of the coupling node. It is then either stored in memory until the time of forwarding (store-and-forward method) or forwarded directly to transmit port (cut-through method) At the time of transmission at the data telegram will be forwarded via a transmission port to further coupling nodes or destination nodes. At the receive port of the destination node it is received, stored on this node and provided for an application of the destination node. The source nodes, coupling nodes and destination nodes are synchronized using a timer.

FIG. 3 shows the structure of a DIX Ethernet frame of a data telegram known in the prior art and of an Ethernet frame in accordance with the invention. Header, destination address, source address, realtime type and CRC (cyclic redundancy check) are in the same positions and take up an equal amount of memory space. The DIX Ethernet frame also includes up to 1.5 kbytes of user data. The same memory space is assigned for the Ethernet frame in accordance with the invention to the user data, data status and transfer status.

Figure 4:
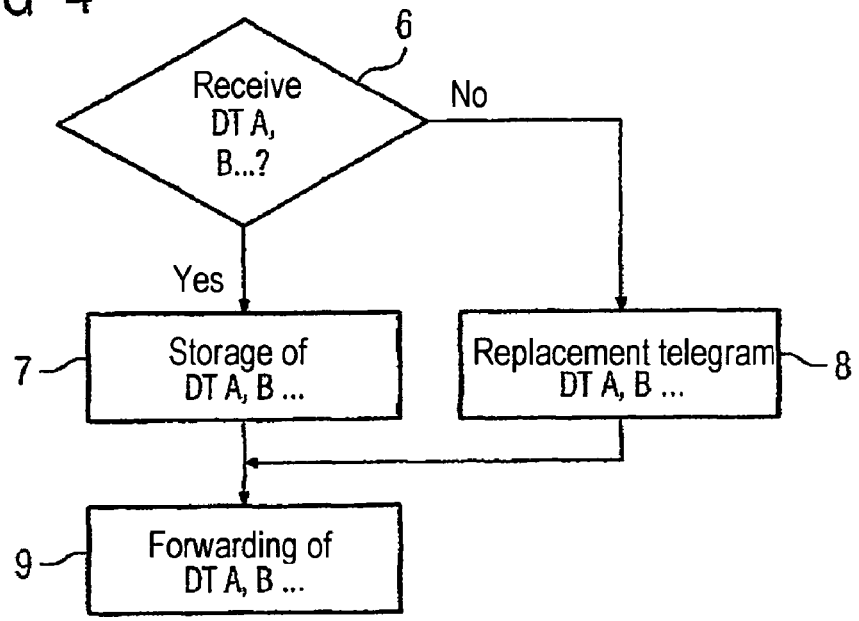
FIG. 4 a flowchart of an inventive method for transferring realtime-critical data with a coupling node.

The flow diagram in accordance with FIG. 4 illustrates the procedural steps in accordance with the invention for transferring realtime-critical data at a coupling node. The coupling node initially expects the arrival of one or more error-free data telegrams DT A, B . . . with a specific identification (step 6). Their number is taken from the receive list. Data telegrams DT A, B . . . , which arrive before the forwarding time are initially stored (store-and-forward method, step 7). By contrast data telegrams which are received at the forwarding time are forwarded directly from receive buffer to the send port (cut-through method). Instead of each expected, error-free data telegram which is not received by the forwarding time, a replacement telegram DT A, B . . . is created with the identification (step 8). At the forwarding time which is taken from the receive list the data telegram or telegrams or the replacement telegrams are forwarded (step 9).

In a preferred embodiment of invention the occurrence of a transmission error is stored at the node at which the transmission error occurred.

Figure 5:
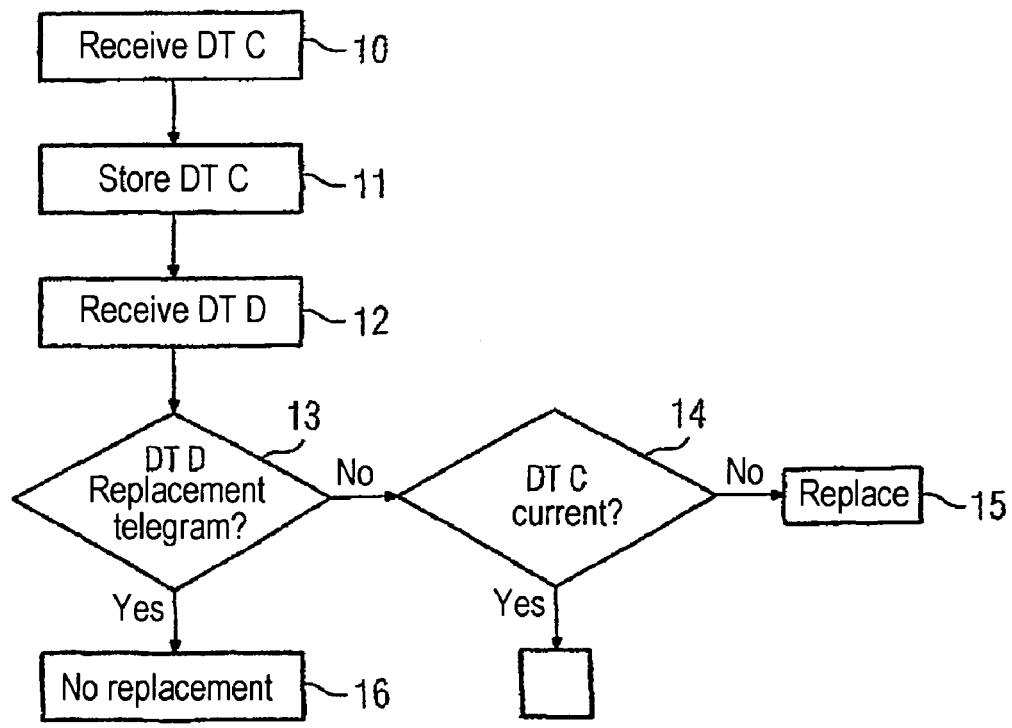
FIG. 5 a flowchart of an inventive method for transferring realtime-critical data at a destination node.

FIG. 5 illustrates the procedural steps in accordance with the invention for transferring realtime-critical data at a destination node. It is assumed that initially a data telegram DT C, which is not a replacement telegram is received (step 10). The case where the first telegram received is a replacement telegram is not relevant for the intention. The data telegram DT C will be stored with an assigned timer value (step 11). If a further data telegram DT D with the same identification is received at the destination node (step 12) an initial check must be made as to whether this telegram is a replacement telegram (step 13). The useful data of the stored data telegram should basically not be replaced by any data of a replacement telegram. If the data telegram DT D is not a replacement telegram, a check is performed in the next step on the basis of the assigned timer value as to whether the data telegram DT C is current (step 14). A current data telegram DT C can be replaced but does not have to be. If the data telegram DT C is not current its useful data and its assigned timer value are replaced (step 15). In a preferred embodiment of the invention the arrival of a replacement telegram at the destination node is recorded. If the data telegram DT D is a replacement telegram, the data telegram DT C is basically not replaced (step 16).

A method has been provided for transmission of real-time data using data telegrams in a data network having at least one coupling node wherein the data telegrams have an identification, data and a transfer status. The coupling node hays at least a transmit list and a receiver list, wherein the transmit lists has information about the number of data telegrams to be received at the corresponding coupling node having specific identifications and a send list has information about the forwarding time assigned via an identification and wherein a transmit port is assigned to an identification.

The invention claimed is:

1. A method for transmission of real-time data using data telegrams in a data network having at least one network coupling node and a network destination node, the data telegrams each having an identification, data and a transfer status, and the coupling node includes, information about the number of data telegrams to be received at the corresponding coupling node, data telegram identifications, and information about the forwarding time assigned to a data telegram via an associated identification, wherein a transmit port is assigned to a data telegram identification, comprising:

for a data telegram whose receipt at the coupling node is intended based on a transmission in the data network, assigning to an identification at the coupling node an identification of the forwarding time of the data telegram;

if a data telegram with the identification of the forwarding time was received by the forwarding time:

forwarding the data telegram to the destination node via the transmit port of the coupling node assigned to the identification; and if an expected data telegram with the identification of the forwarding time was not received by the forwarding time:

creating one or more replacement telegrams each replacing an expected, not received data telegram, each replacement telegram including, as an identification, identification of a not received telegram and further including a data transfer status indicating that the telegram is a replacement telegram; and forwarding, in place of a not received data telegram, a corresponding created replacement telegram to a destination node via the transmit port of the coupling node assigned to the identification of the not received data telegram.

2. A method in accordance with claim 1, wherein the occurrence of a transmission error is stored at the node at which it occurred.

3. A method in accordance with one of the claim 2, wherein the replacement telegram contains data.

4. A method in accordance with claim 2, wherein the replacement telegram contains information about the type of transmission error that has occurred in the transfer status.

5. A method in accordance with claim 1, wherein the replacement telegram contains data.

6. A method in accordance with claim 1, wherein the replacement telegram contains information about the type of transmission error that has occurred in the transfer status.

7. A method in accordance with claim 1, wherein a replacement telegram is received by a data network node on a data path to a destination node without triggering an error reaction at the data network node.

8. A method in accordance with claim 1, further comprising:

receiving a data telegram at a destination node;

storing the data of the first data telegram which is not a replacement telegram and an assigned timer value;

receiving at least one further data telegram.

9. A method in accordance with claim 8, wherein the replacement telegram at the destination node is stored.

10. A method in accordance with claim 8, wherein if the further data telegram is a replacement telegram, not replacing the stored data and the assigned timer value.

11. A method in accordance with claim 8, wherein if the further data telegram is not a replacement telegram and the stored data is no longer current according to the assigned timer value, replacing the stored data and the assigned timer value.

12. A method for a coupling node in a data network for transmission of realtime data by at least one data telegram, the data telegram having an identification, data and a transfer status, the method comprising:

expecting the receipt of one or more data telegrams with an identification up to the forwarding time assigned to the identification at a coupling node;

if one or more data telegrams with the identification was received by the forwarding time:

forwarding the data telegram or telegrams via the send port or send ports of the coupling node assigned to the identification;

if one or more expected data telegrams with the identification was not received by the forwarding time:

creating one or more replacement telegrams each replacing an expected, not received data telegram, each replacement telegram including, as an identification, identification of a not received telegram and further including a data transfer status indicating that the telegram is a replacement telegram; and forwarding, in place of a not received data telegram, a corresponding one of the created replacement telegrams to a destination node via the transmit port of the coupling node assigned to the identification of the not received data telegram.

* * * * *